Nov. 3, 1964     W. D. HOFER     3,155,170
FLEXIBLE LINK HARROW
Filed July 31, 1963
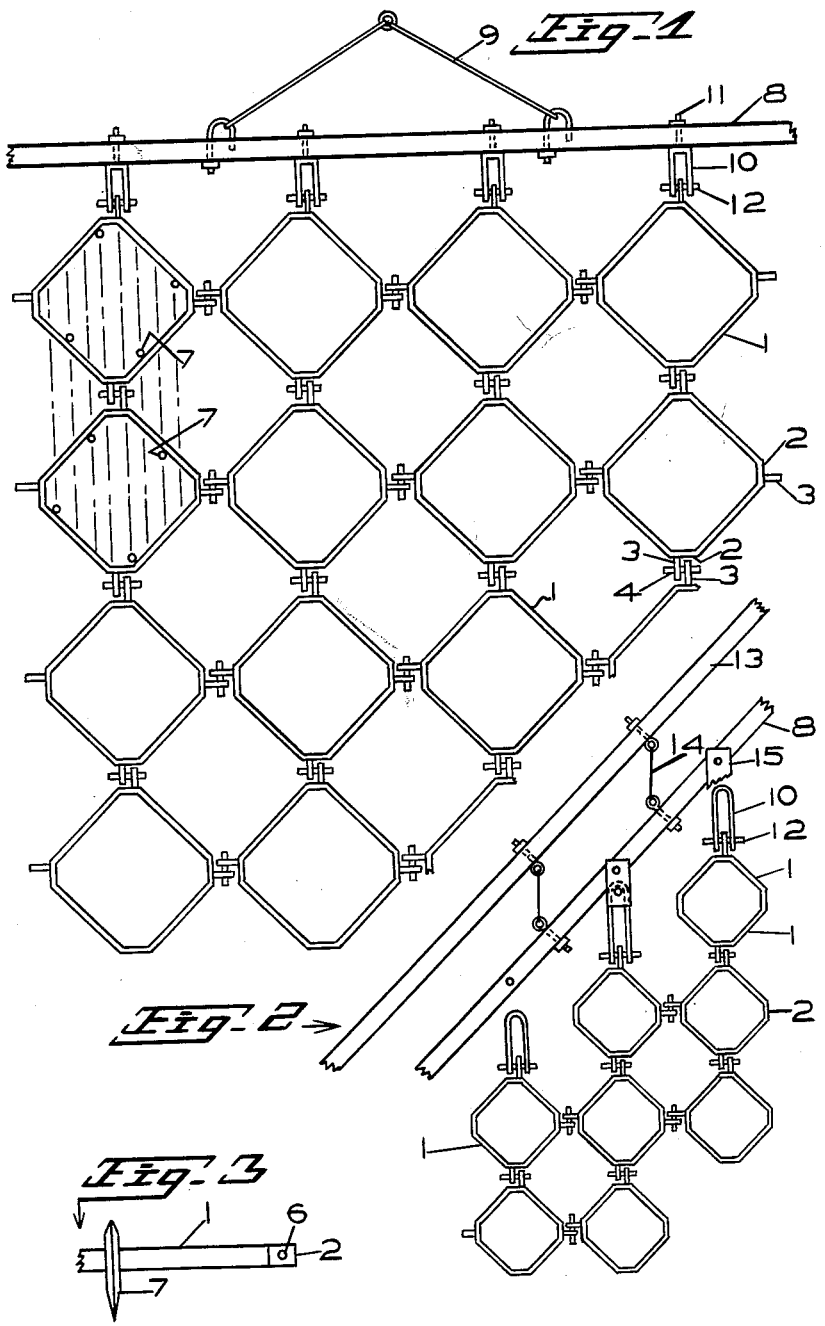

3,155,170
FLEXIBLE LINK HARROW
Walter David Hofer, Brocket, Alberta, Canada, assignor of one-fourth to Lawrence Benjamin Levine and three-fourths to Garth Alphonse Turcott, both of Pincher Creek, Alberta, Canada
Substituted for abandoned application Ser. No. 48,316, Aug. 8, 1960. This application July 31, 1963, Ser. No. 303,705
1 Claim. (Cl. 172—623)

This invention relates to harrows for soils cultivating and has reference to a flexible assembly in which a series of harrow units are connected to move vertically and horizontally in relation to each other in traveling over the ground.

In the art to which the invention relates harrows are more usually made up of elements forming a complete unit lacking flexibility in traveling over the land, and in which damaged parts are not readily replaceable.

The present device is designed to effect improvements in soil cultivating harrows of this character by forming the harrow of a series of square units that are pivotally connected together at the corners to be flexible horizontally and vertically, and in which the units are readily replaceable by the removal of connecting pins.

The units can be assembled for travel hitched to a draw bar that lies at right angles to the travel of the harrow, or with the draw bar inclined as it would be if attached behind a one-way disk.

The two way flexibility of the harrow is effective for self-cleaning, with little chance of rocks lodging in the units, and for following the contours of the land.

Other features and advantages of the invention will become apparent by reference to the accompanying description taken in conjunction with the drawings.

In the drawings, illustrating a preferred embodiment of the invention,

FIG. 1 is a plan view of a harrow in accordance with my invention, shown with parts of the harrow removed and the teeth largely omitted.

FIG. 2 is a plan view of a series of connected harrow units, illustrating attachment of the units to a draw bar disposed at an angle to the direction of travel of the harrow, as when used with a one-way disk, and shown with the teeth omitted.

FIG. 3 shows a side view of a fragment of a harrow unit taken from the inside and illustrating attachment of a tooth.

Having reference to the drawings, the harrow is made up of a series of square unit frames 1, each having truncated corners 2 from which integral hinge lugs 3 project outward and by which the frames may be pivotally connected to adjoining units and to the draw bar by pins 4 engageable in openings, as at 6 in FIGURE 3, in the lugs. These lugs are attached to the corners 2 slightly off center to permit overlapping of the lugs of connected frames, and the pins would be held in the lugs, secured as by cotter pins or other suitable means.

To these square frames are attached teeth 7, welded thereto and arranged as desired both as to the number of teeth per unit and the arrangement of teeth to provide an overall pattern. The teeth are attached projecting at right angles to the unit frames with the projecting ends of unequal length, as shown in FIGURE 3, so that by reversing the harrow different harrowing depths are obtained. Preferably the teeth project three inches in one direction and five inches in the other.

The units are attached to a draw bar 8 with hitch 9 by flat iron clevises 10 attaching to the draw bar by bolts 11 and to the unit lugs by pins 12.

A harrow section is formed as shown in FIGURE 1, that is with six squares to the section, but when the harrow is set up for travel behind a one-way disk the arrangement of the squares would be as shown in FIGURE 2. A unit may be removed from a section by taking out the connecting pins and the unit replaced by a fresh one.

Perferably there are four teeth in each square, arranged as shown in FIGURE 1, with the upper tooth to the immediate left of the coupling. Each tooth in turn is similarly placed in relation to the coupling but the spacing of the teeth from the coupling varies so that in a pair of squares attached in following relation the one from the other the teeth of the two squares would be spaced uniformly so that the eight teeth of the two squares would have a spacing of two inches apart relative to the line of travel of the section, as shown by the dashed lines.

In FIGURE 2 a hitch for use with a one-way disc is shown in which the clevises 10 pivotally attach by couplings 15 to the draw bar 8, and the draw bar is connected by links 14 to the disc frame cross bar 13.

What I claim and wish to secure by Letters Patent is:

A harrow assembly for attachment in following relation to a draw bar, said assembly comprising a series of square unit frames each having its corners truncated and a lug fixed to each truncated corner off center by which lugs of the corners of adjoining frames may overlap, said lugs having pin receiving openings, pins engageable in said openings for connection of unit frames together and to the drawbar, said draw bar having clevises to which lugs of the frames are attachable, and teeth fixed to the sides of the unit frames arranged in a pattern common to all units with one tooth to each side of a frame with the teeth of each frame so spaced differently from the frame corners (disregarding said truncation) the frames may be connected for a set of teeth in any one frame to travel in the intervals between the soil cultivated by teeth of frames aligned in advance or to the rear thereof.

References Cited by the Examiner
UNITED STATES PATENTS
181,660   8/76   Flower _____ 172—623
FOREIGN PATENTS
1,025,458   4/53   France.

T. GRAHAM CRAVER, *Primary Examiner.*